US011360585B2

(12) United States Patent
Rizzardini et al.

(10) Patent No.: US 11,360,585 B2
(45) Date of Patent: Jun. 14, 2022

(54) GESTURE RECOGNITION SYSTEM AND METHOD FOR A DIGITAL-PEN-LIKE DEVICE AND CORRESPONDING DIGITAL-PEN-LIKE DEVICE

(71) Applicant: STMicroelectronics S.r.l., Agrate Brianza (IT)

(72) Inventors: Federico Rizzardini, Settimo Milanese (IT); Lorenzo Bracco, Chivasso (IT); Stefano Paolo Rivolta, Desio (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 50 days.

(21) Appl. No.: 16/922,752

(22) Filed: Jul. 7, 2020

(65) Prior Publication Data
US 2021/0034167 A1 Feb. 4, 2021

(30) Foreign Application Priority Data

Jul. 31, 2019 (IT) .................. 102019000013440

(51) Int. Cl.
*G06F 3/038* (2013.01)
*G06F 3/01* (2006.01)
*G06F 3/0346* (2013.01)

(52) U.S. Cl.
CPC .............. *G06F 3/038* (2013.01); *G06F 3/017* (2013.01); *G06F 3/0346* (2013.01)

(58) Field of Classification Search
CPC .............................. G06F 3/017; G06F 3/0346
See application file for complete search history.

(56) References Cited

U.S. PATENT DOCUMENTS

| 10,732,695 | B2 * | 8/2020 | Zyskind .............. G06F 3/04883 |
| 2012/0016641 | A1 | 1/2012 | Raffa et al. |
| 2014/0002338 | A1 | 1/2014 | Raffa et al. |
| 2014/0236529 | A1 | 8/2014 | Gyorfi |
| 2016/0334880 | A1 | 11/2016 | Favre et al. |
| 2019/0034074 | A1 | 1/2019 | Shi et al. |
| 2019/0041993 | A1 * | 2/2019 | Crippa .............. G05B 19/0426 |

FOREIGN PATENT DOCUMENTS

EP 2693300 A2 2/2014

* cited by examiner

*Primary Examiner* — Daniell L Negron
(74) *Attorney, Agent, or Firm* — Slater Matsil, LLP (57) ABSTRACT

A gesture-recognition system for a digital-pen-like device, envisages: at least one motion sensor to provide at least one motion signal indicative of movements of the digital-pen-like device; a gesture-recognition signal processor, coupled to the at least one motion sensor to process the motion signal and to implement a plurality of gesture recognition algorithms based on the motion signal, each of the gesture recognition algorithms being configured to recognize a corresponding gesture performed by a user of the digital-pen-like device; and a controller coupled to the gesture-recognition signal processor and transmitting gesture-recognition data indicative of a recognized gesture towards a host apparatus, with which the digital-pen-like device is associated.

20 Claims, 5 Drawing Sheets

GESTURE RECOGNITION SYSTEM AND METHOD FOR A DIGITAL-PEN-LIKE DEVICE AND CORRESPONDING DIGITAL-PEN-LIKE DEVICE

CROSS-REFERENCE TO RELATED APPLICATIONS

This application claims the benefit of Italian Patent Application No. 102019000013440, filed on Jul. 31, 2019, which application is hereby incorporated herein by reference.

TECHNICAL FIELD

The present solution relates to a gesture-recognition system and method for a digital-pen-like device and to a corresponding digital-pen-like device.

BACKGROUND

As it is known, digital (or smart) pen (or pencil or stylus) are portable digital-pen-like hand-held devices that are designed to be coupled to an electronic apparatus acting as a host apparatus (e.g., a tablet, a phablet, a smartphone, a laptop, a smart TV, a monitor, or the like) and may have several functions in addition to that of taking notes and making drawings.

Those additional functions may include for example a pointing function, the digital-pen-like device in this case acting as an "air pointer", designed to implement a HID (Human Interface Device) pointer (or mouse) interface, or protocol, in order to generate displacement data (in particular, information associated with a displacement between a current and a previous position of the same digital-pen-like device) and send the displacement data to the host apparatus, in terms of coordinates in a screen-frame of the same host apparatus. A controller of the host apparatus is thus able to move a displayed object (e.g., a cursor or similar element) on the screen-frame of a corresponding display based on the received displacement information.

Digital-pen-like devices may also have additional functions, in order to enable advanced actions for the user, such as slide interactions, or, in general, digital media content interactions, gaming actions and so on.

Digital-pen-like devices typically contain internal electronics coupled to a PCB (Printed Circuit Board) and have features such as touch sensitivity, input buttons, memory for storing data and data transmission capabilities.

As it is known, new generation devices are required to have a very small design (so called ultra-slim design), and consequently have limited capabilities in terms of battery (a very low-power consumption is therefore required) and stringent size constraints in the PCB design.

Due to these size constraints, the use of physical or mechanical buttons or of touch surfaces or elements is limited, due to the lack of available space, both in an external casing of the digital-pen-like devices and in the internal PCB, which has to provide electrical connections between the same buttons (or touch surfaces or elements) and a processing controller, managing general operation of the same digital-pen-like devices.

For example, known solutions envisage a limited number of buttons (typically, one or two). User interaction is therefore very limited; PCB design is in any case complex; mechanical buttons and corresponding connections to the controller reduce area for the battery, causing a poor device lifetime. Moreover, the controller usually has only one wake-up interrupt pin, so that the same controller has to be always awake (with a high current consumption) in order to monitor all button activations.

Other known solutions envisage a touch surface for user input. In this case, however, a high power consumption is required due to the need to process input data by the controller; user interaction is generally awkward or even unfeasible with ultra-small form factor devices; moreover, a high cost is associated to these kind of solutions.

SUMMARY

In an embodiment, a gesture-recognition system for a digital-pen-like device includes a motion sensor configured to provide a motion signal indicative of movements of the digital-pen-like device; a gesture-recognition signal processor, coupled to the motion sensor and configured to process the motion signal and to implement a plurality of gesture recognition algorithms based on the motion signal, where each of the gesture recognition algorithms is configured to recognize a corresponding specific gesture performed by a user with the digital-pen-like device. The system includes a controller coupled to the gesture-recognition signal processor and configured to transmit gesture-recognition data indicative of a recognized gesture towards a host apparatus, with which the digital-pen-like device is associated.

In an embodiment, an electronic system comprises a digital-pen-like device, which comprising a motion sensor configured to provide a motion signal indicative of movements of the digital-pen-like device. The digital-pen-like device includes a gesture-recognition signal processor, coupled to the motion sensor and configured to process the motion signal and to implement a plurality of gesture recognition algorithms based on the motion signal, where each of the gesture recognition algorithms being configured to recognize a corresponding specific gesture performed by a user with the digital-pen-like device. The digital-pen-like device includes a controller coupled to the gesture-recognition signal processor and configured to transmit gesture-recognition data indicative of a recognized gesture towards a host apparatus, with which the digital-pen-like device is associated.

In an embodiment, a gesture-recognition method for a digital-pen-like device includes generating a motion signal indicative of movements of the digital-pen-like device and processing the motion signal to implement a plurality of gesture recognition algorithms based on the motion signal. Each of the gesture recognition algorithms being configured to recognize a corresponding specific gesture performed by a user with the digital-pen-like device. The method further includes transmitting gesture-recognition data indicative of a recognized gesture towards a host apparatus, with which the digital-pen-like device is associated.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF ILLUSTRATIVE EMBODIMENTS

The need is felt in this technical field for digital-pen-like devices having an improved user interaction that overcomes the limitation of having few buttons or touch surfaces or elements; a simpler PCB design to reduce costs and make room for increased battery size; and a low power consumption in order to maximize battery life.

The aim of the present solution is to satisfy, at least in part, the above need.

As will be discussed in detail in the following, an aspect of the present solution envisages use of motion-sensor data as input to a set of gesture-recognition algorithm modules to detect user gestures on the digital-pen-like device, such as (purely by way of example): a shake (left and right); a check sign; a circle (clockwise and counter-clockwise). The detected gestures are then used to trigger actions in a host electronic apparatus (thereby replacing mechanical buttons or similar elements).

Advantageously, a controller of the digital-pen-like device is kept in a sleep-mode (with very low power consumption); when a gesture is detected, the controller is woken-up and a data-packet is sent to the host apparatus, indicative of the recognized gesture, in order to trigger the corresponding action.

Figure 1:
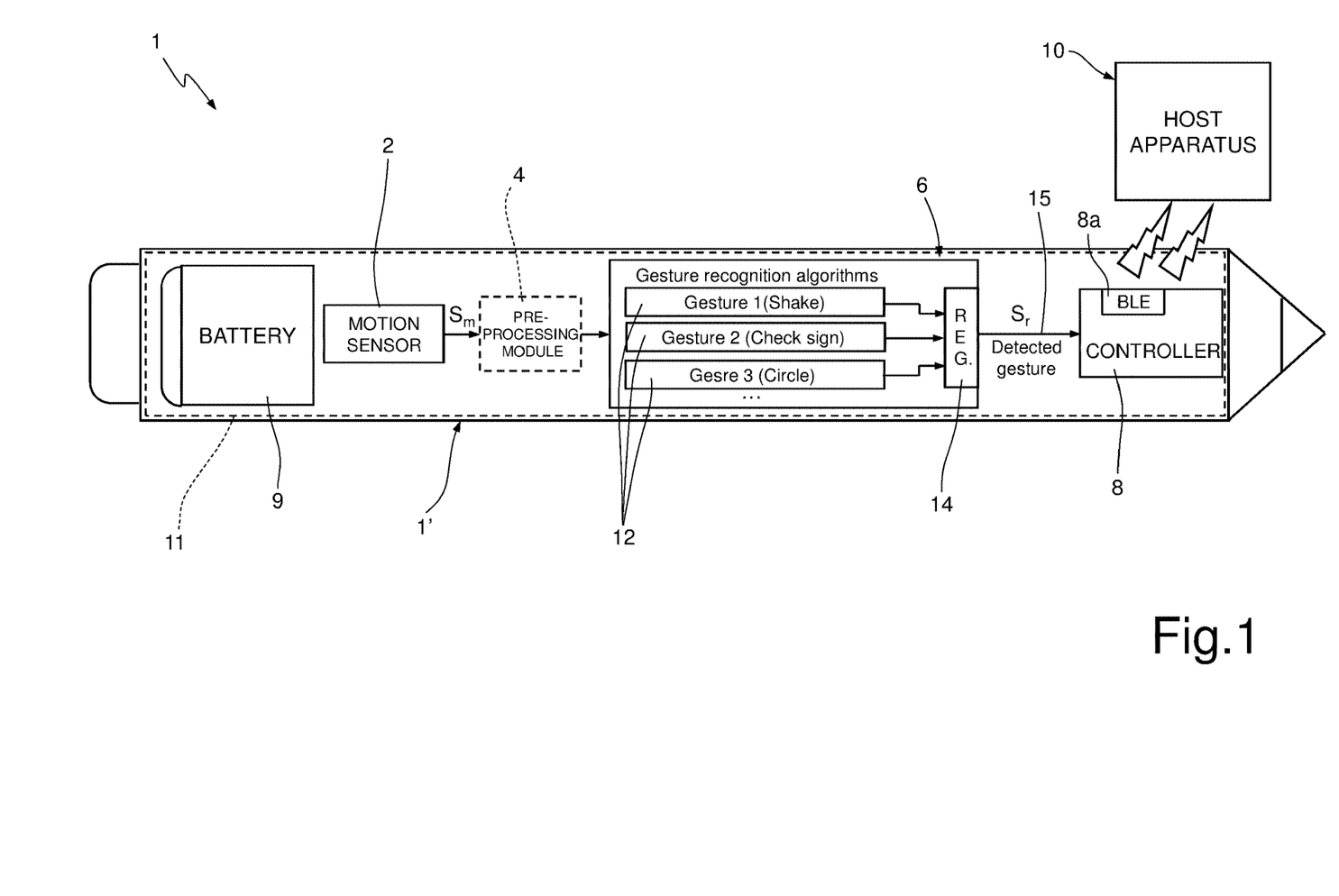
FIG. 1 shows a schematic block diagram of a digital-pen-like device, according to an embodiment of the present solution.

FIG. 1 shows a digital-pen-like device 1 according to an embodiment of the present solution, of the hand-held or portable type, which comprises, within a case or housing 1' thereof: at least one motion sensor 2, e.g. an accelerometer sensor, in particular a MEMS (Micro Electro Mechanical System) tri-axial sensor, providing a motion signal $S_m$ indicative of movements of the digital-pen-like device 1 (e.g., an accelerometer signal Acc[x, y, z] indicative of the accelerations acting on the digital-pen-like device 1) with components along three axes X, Y, Z of a 3D-space inertial reference system associated with the same digital-pen-like device 1 (in the following discussion, the axes X, Y, Z of the 3D-space inertial reference system follow the so-called "ENU", East-North-Up, orientation, according to which axis X points East, axis Y points North, and axis Z points upwards); optionally (as denoted by the dashed line), a pre-processing module 4, coupled to the motion sensor 2 to receive at its input the motion signal $S_m$, and configured to perform pre-processing operations, such as filtering operation (e.g., a high-pass filtering) on the same motion signal $S_m$; a gesture-recognition signal processor 6, coupled to the pre-processing module 4 (or directly to the motion sensor 2, in case the same pre-processing module 4 is not present) to receive the (optionally pre-processed, e.g. filtered) motion signal $S_m$, and configured to implement a number of dedicated gesture-recognition algorithms (envisaging a respective number of processing operations) based on the same motion signal $S_m$, to recognize a corresponding number of gestures performed by the user with the digital-pen-like device 1, and to generate at its output a gesture-recognition signal $S_r$; a controller 8, e.g. a microcontroller (or a microprocessor or any other suitable computing unit), coupled to the gesture-recognition signal processor 6 to receive the gesture-recognition signal $S_r$ and configured to activate a data transmission module 8a, e.g. a Bluetooth Low-Energy (BLE) module, to send wirelessly gesture-recognition information, e.g. a data packet indicative of the gesture that has been detected and recognized (e.g., to a host apparatus, here shown schematically and denoted with 10, to which the digital-pen-like device 1 is operatively coupled); in a known manner, further data may be communicated to the host apparatus 10 by the controller 8, e.g. already in a format recognized by the same host apparatus 10, such as in the HID format; and a battery unit 9, configured to provide a power supply to all components of the digital-pen-like device 1, namely the motion sensor 2, the (optional) pre-processing module 4, the gesture-recognition signal processor 6 and the controller 8.

As shown schematically, the above components of the digital-pen-like device 1, namely the motion sensor 2, the (optional) pre-processing module 4, the gesture-recognition signal processor 6 and the controller 8, are coupled to a same circuit board (e.g., a PCB—Printed Circuit Board) ii, housed within the casing 1' of the digital-pen-like device 1.

It is underlined that the digital-pen-like device 1 may also comprise further motion sensors, e.g. a gyroscope sensor, in particular a MEMS tri-axial gyroscope, providing a gyroscopic signal Gyro[x, y, z], indicative of the angular rate around the three axes X, Y, Z of the 3D-space inertial reference system associated with the same digital-pen-like device 1, as a further motion signal $S_m$. In this case, the gesture-recognition signal processor 6 is configured to process the motion signals $S_m$ (i.e., the accelerometer and gyroscopic signals Acc [x, y, z], Gyro[x, y, z]) and the implemented dedicated gesture-recognition algorithms may be based on one or more of the same motion signals $S_m$, depending on the gesture to be recognized.

According to an aspect of the present solution, as shown in the same FIG. 1, the gesture-recognition signal processor 6 is implemented as a hardware unit, comprising e.g. a digital signal processor implementing FSM (Finite State Machine) processing resources 12 (in particular, a dedicated FSM processing resource 12 for each of the gesture to be recognized, in the example denoted as 'Gesture 1', e.g. a shake gesture, 'Gesture 2', e.g. a check-sign gesture and 'Gesture 3', e.g. a circle gesture), the aforementioned FSM being implemented in ASIC or FPGA hardware or software, or any other kind of computational resources.

The gesture-recognition signal processor 6 in the embodiment shown further comprises one or more data registers 14, coupled to the FSM processing resources 12, configured to store gesture-recognition data indicative of the specific gesture that has been detected.

In this embodiment, a single coupling line 15 couples the gesture-recognition signal processor 6 to an interrupt input of the controller 8.

The same controller 8 is usually kept in sleep mode; when an interrupt signal is received from the gesture-recognition signal processor 6 via the coupling line 15, at the detection of a gesture by the same gesture-recognition signal processor 6, the controller 8 wakes-up and performs a reading of the data stored in the data register 14, in order to read the gesture-recognition data indicative of the specific gesture that has been recognized.

In an alternative embodiment, the gesture-recognition signal processor 6 may be implemented via a software application program; in that case, the same gesture-recognition signal processor 6 may include a computing unit and a suitable non-volatile memory storing computing instructions to implement the gesture-recognition algorithms based on the input motion data.

Figure 2:
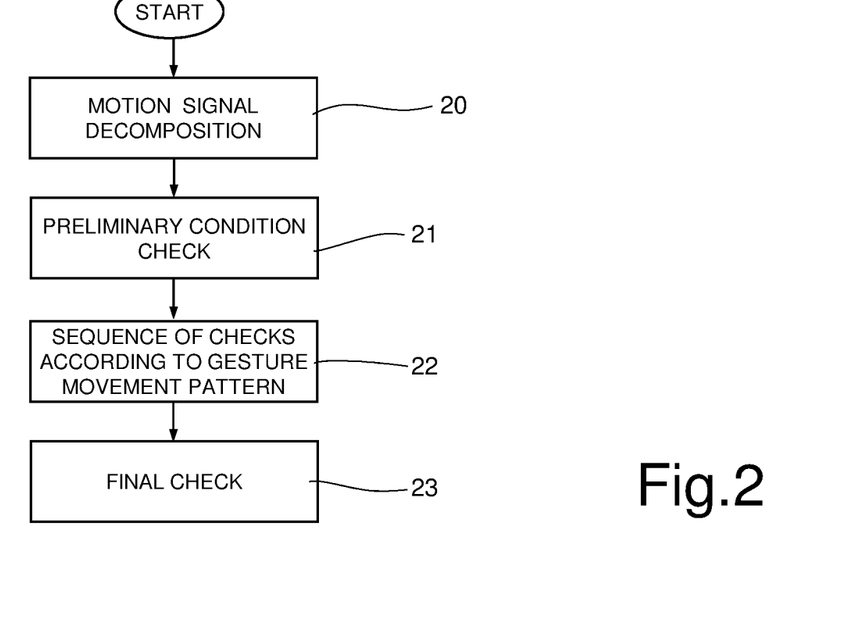
FIG. 2 is a schematic flow chart of operations performed according to a generic gesture-recognition algorithm implemented in the digital-pen-like device of FIG. 1.

FIG. 2 shows a generic gesture-recognition algorithm implemented by the gesture-recognition signal processor 6 based on the at least one motion signal $S_m$, to recognize a gesture made by the user with the digital-pen-like device 1.

As shown at step 20, the motion signal $S_m$ is first decomposed in respective motion-signal components along the three axes X, Y, Z of the 3D-space inertial reference system associated with the digital-pen-like device 1: $S_m[x]$, $S_m[y]$ and $S_m[z]$.

A preliminary condition is then checked, at step 21, based on at least one (i.e., based on one or more) of the motion-signal components $S_m[x]$, $S_m[y]$, $S_m[z]$, the preliminary condition being indicative of a preliminary phase of the gesture to be recognized (the same preliminary condition further allowing to discriminate between different gestures to be recognized).

For example, the check of the preliminary condition may include comparing the motion-signal component(s) with a certain threshold.

As shown at step 22, in response to the preliminary condition having been verified, a sequence of further checks is then performed over a given time interval, each check being based on at least one of the motion-signal components $S_m[x]$, $S_m[y]$, $S_m[z]$ and the overall sequence being indicative of the gesture to be recognized (in particular of the movement pattern associated with the same gesture).

For example, each of the further checks may again include comparing the motion-signal component(s) with a certain threshold.

In response to the sequence of checks having been verified, as shown at step 23, a final check is implemented, again based on at least one of the motion-signal components $S_m[x]$, $S_m[y]$, $S_m[z]$, the final check allowing to confirm and validate the recognition of the specific gesture and reject false or spurious detections (the final check thus representing a failsafe check).

For example, the final check may again include comparing the motion-signal component(s) with a certain threshold.

Exemplary gesture-recognition algorithms implemented by the gesture-recognition signal processor 6 are now discussed in more details; these algorithms are, in the example, based on the use only of an accelerometer sensor and of the accelerometer signal Acc[x, y, z] as the motion signal $S_m$.

Figure 3A:
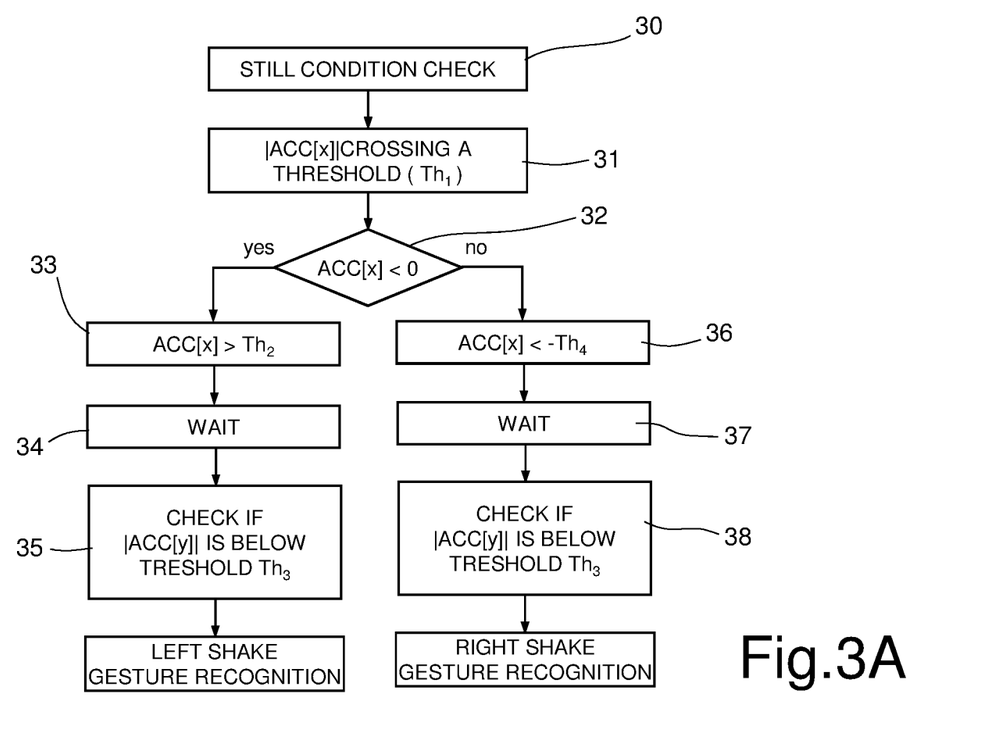
FIG. 3A is a schematic flow chart of operations performed according to a first specific gesture-recognition algorithm in the digital-pen-like device of FIG. 1.
Figure 3B:
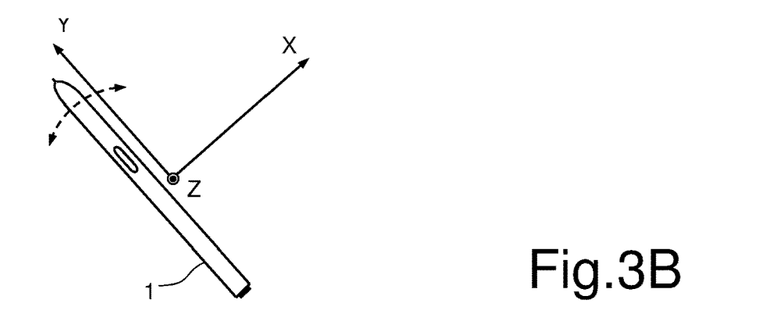
FIG. 3B is a schematic depiction of the digital-pen-like device showing an associated reference system and movements according to the gesture to be recognized by the first specific gesture-recognition algorithm.

In particular, FIG. 3A shows a flow chart of operations performed to recognize a shake gesture performed by a user with the digital-pen-like device 1, either in a left or in a right direction along the X axis of the 3D-space inertial reference system associated with the digital-pen-like device 1 (which is schematically depicted in FIG. 3B, together with the X, Y, Z axes of the same 3D-space inertial reference system, according to the above defined 'ENU' orientation and a dashed-line arrow denoting the movement according to the above discussed shake gesture).

Figure 4:
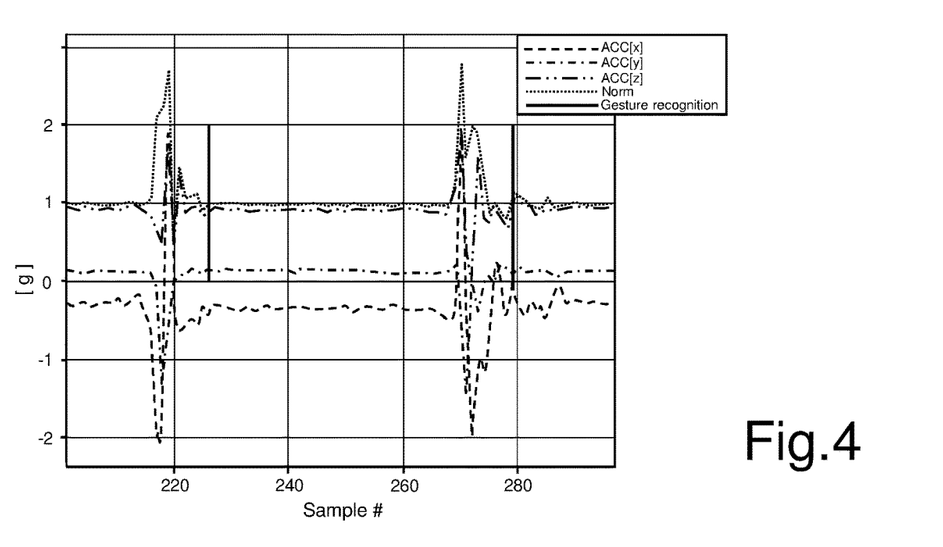
FIG. 4 shows plots of quantities related to the first specific gesture-recognition algorithm.

FIG. 4 moreover shows the plots of the components of the accelerometer signal Acc[x, y, z] along the X, Y, Z axes during the gesture to be recognized and moreover the plot of the norm of the same accelerometer signal Acc and the gesture-recognition signal $S_r$, in this case being an impulse signal that is asserted (with generation of a corresponding pulse) upon gesture recognition.

At step 30, the preliminary condition is checked, in this case being a check that the digital-pen-like device 1 remains in a still state for a given time interval (the norm of the accelerometer signal Acc being about 1 g throughout this time interval). It is noted that the check of the preliminary condition in this case involves jointly all the components of the motion-signal $S_m$ (in this case, the accelerometer signal Acc), which are jointly processed, in a known manner, to determine the norm of the same motion-signal $S_m$.

At step 31, the absolute value of the accelerometer component Acc[x] along the X axis is then compared with a first threshold $Th_1$, having a high value, e.g. in the order of 100 mg (or higher).

If crossing of the first threshold $Th_1$ is detected, the sign of the same accelerometer component Acc[x] along the X axis is checked at step 32 (i.e., it is checked whether the value of Acc[x] is lower or higher than 0), in order to discriminate the presence of a possible shake-gesture in the left or in the right direction.

If the condition Acc[x]<0 is verified (indicative of a shake in the left direction), as shown at step 33, the value of the same accelerometer component Acc[x] along the X axis is then compared to a second threshold $Th_2$ (that may be equal to or different from the above first threshold $Th_1$), in particular to check if the same value is higher than the second threshold $Th_2$. As shown in FIG. 4, the pattern of the accelerometer component Acc[x] during the shake gesture in the left direction indeed envisages first a negative peak, immediately followed by an opposite, i.e. positive, peak.

As shown at step 34, the algorithm then envisages a waiting time of a suitable duration.

Afterwards, as shown at step 35, a further check is performed to verify that the digital-pen-like device 1 is still or stationary and flat, i.e. in a horizontal plane (being the plane defined by the X and Y axis of the 3D reference system).

In particular, the absolute value of the accelerometer component Acc[y] along the Y axis is compared with a third threshold $Th_3$. If the absolute value is lower than the third threshold $Th_3$ (possibly throughout a given time interval), the digital-pen-like device 1 is determined to be stationary and flat, so that the recognition of the gesture (in particular the left-shake gesture) is completed and the gesture-recognition signal $S_r$ is asserted (a respective impulse is generated, as shown in the left-side portion of the plot of FIG. 4).

If instead the condition Acc[x]>0 is verified at step 32 (indicative of a shake in the right direction), as shown at step 36, the value of the accelerometer component Acc[x] along the X axis is then compared to a fourth threshold $-Th_4$ (having a negative value, that may be equal to or different from the above first threshold $Th_1$), in particular to check if the same value is lower than the fourth threshold $-Th_4$. As shown in FIG. 4, the pattern of the accelerometer component Acc[x] during the shake gesture in the right direction indeed envisages first a positive peak, immediately followed by an opposite, i.e. negative, peak.

As shown at step 37, the algorithm then envisages a waiting time of a suitable duration.

Afterwards, as shown at step 38, the further (or final) check is performed to verify that the digital-pen-like device 1 is still or stationary in the horizontal plane.

In particular, the absolute value of the accelerometer component Acc[y] along the Y axis is compared with the third threshold $Th_3$. If the absolute value is lower than the third threshold $Th_3$ (possibly throughout a given time interval), the digital-pen-like device 1 is determined to be stationary and flat, so that the recognition of the gesture (in particular the right-shake gesture) is completed and the gesture-recognition signal $S_r$ is asserted (a respective impulse is generated, as shown in the right-side portion of the plot of FIG. 4).

Figure 5A:
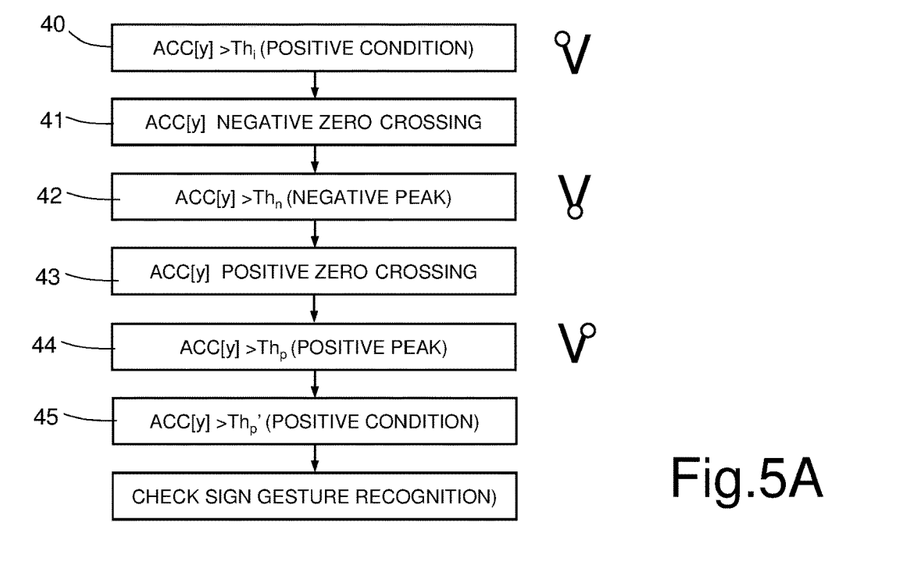
FIG. 5A is a schematic flow chart of operations performed according to a second specific gesture-recognition algorithm in the digital-pen-like device of FIG. 1.
Figure 5B:
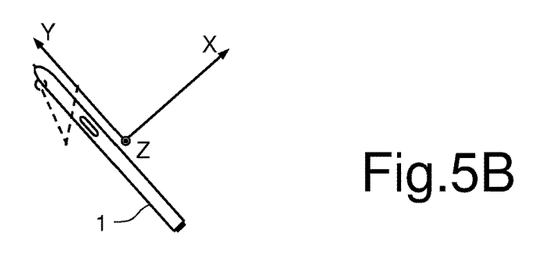
FIG. 5B is a schematic depiction of the digital-pen-like device showing an associated reference system and movements according to the gesture to be recognized by the second specific gesture-recognition algorithm.

FIG. 5A shows a flow chart of operations performed to recognize a check-sign gesture performed by the user with the digital-pen-like device 1 (which is schematically depicted in FIG. 5B, together with the X, Y, Z axes of the same 3D-space inertial reference system, according to the above defined 'ENU' orientation and the above discussed check-sign gesture denoted with a dashed line).

Figure 6:
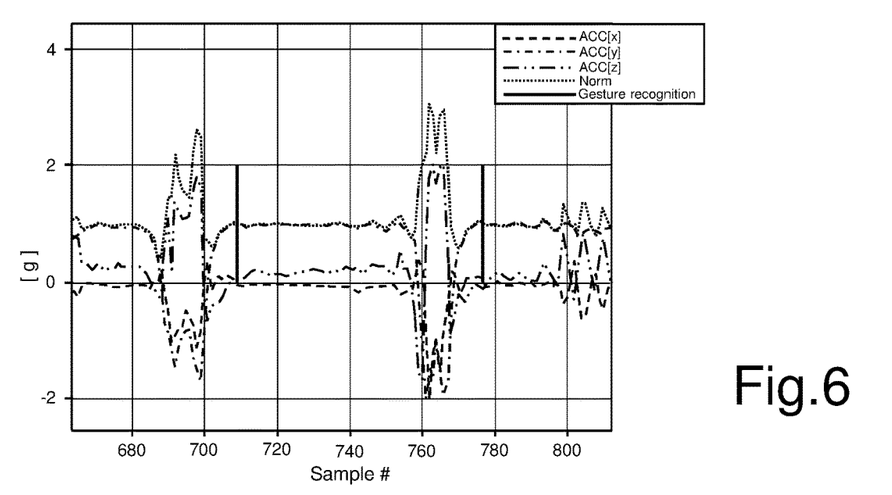
FIG. 6 shows plots of quantities related to the second specific gesture-recognition algorithm.

FIG. 6 moreover shows the plots of the components of the accelerometer signal Acc[x, y, z] along the X, Y, Z axes during the gesture to be recognized and moreover the plot of the norm of the same accelerometer signal Acc and the generated gesture-recognition signal $S_r$.

In detail, as shown at step 40, the preliminary condition being checked is in this case a check that the digital-pen-like device 1 in the horizontal plane or is pointing upwards; in particular, the accelerometer component Acc[y] along the Y axis is compared with an initial threshold $Th_1$, to check the condition Acc[y]22 $Th_1$ (as shown schematically in the same FIG. 5A, this corresponds to checking the presence of a first positive apex of the 'V' check-sign gesture).

If the above condition is verified, as shown at step 41, a negative zero crossing of the same accelerometer component Acc[y] along the Y axis is then checked.

If the negative zero crossing is verified, a negative peak of the accelerometer component Acc[y] along the Y axis is subsequently checked, at step 42, comparing the same accelerometer component Acc[y] with a negative threshold $Th_n$ (as shown schematically in the same FIG. 5A, this corresponds to checking the presence of the negative apex of the 'V' check-sign gesture).

Afterwards, as shown at step 43, a positive zero crossing of the same accelerometer component Acc[y] along the Y axis is checked.

If the positive zero crossing is verified, a positive peak of the accelerometer component Acc[y] along the Y axis is checked, at step 44, comparing the same accelerometer component Acc[y] with a positive threshold $Th_p$ (as shown schematically in the same FIG. 5A, this corresponds to checking the presence of a second positive apex of the 'V' check-sign gesture).

Afterwards, as shown at step 45, the final check is performed to verify that the digital-pen-like device 1 remains in the position reached (or near the same position) for a given time interval.

In particular, the value of the accelerometer component Acc[y] along the Y axis is compared with a further positive threshold $Th_p'$ (which may be equal to the positive threshold $Th_p$) and it is checked that the condition Acc[y]>$Th_p'$ is valid throughout the given time interval.

If this condition is verified, the recognition of the gesture (in particular the check-sign gesture) is completed and the gesture-recognition signal $S_r$ is asserted (a respective impulse being generated).

Figure 7A:
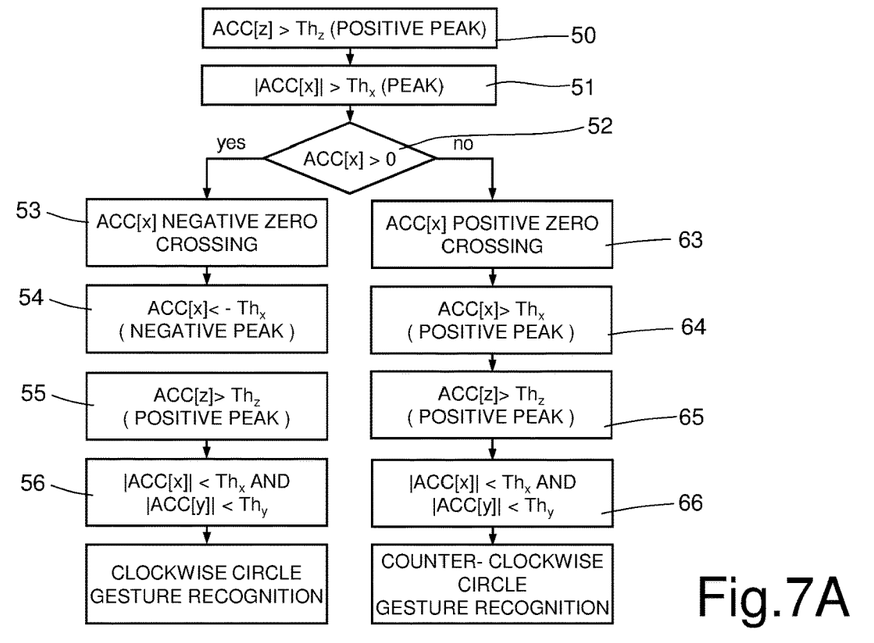
FIG. 7A is a schematic flow chart of operations performed according to a third specific gesture-recognition algorithm in the digital-pen-like device of FIG. 1.
Figure 7B:
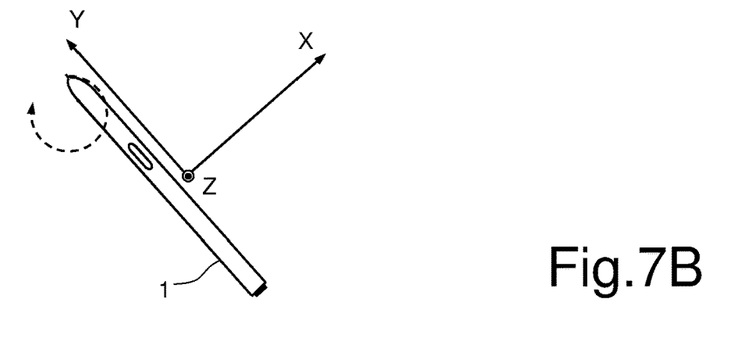
FIG. 7B is a schematic depiction of the digital-pen-like device showing an associated reference system and movements according to the gesture to be recognized by the third specific gesture-recognition algorithm.

FIG. 7A shows a flow chart of operations performed to recognize a circle gesture performed by the user with the digital-pen-like device 1 (which is schematically depicted in FIG. 7B, together with the X, Y, Z axes of the 3D-space inertial reference system, according to the above defined 'ENU' orientation and the circle gesture denoted with the dashed-line arrow).

Figure 8:
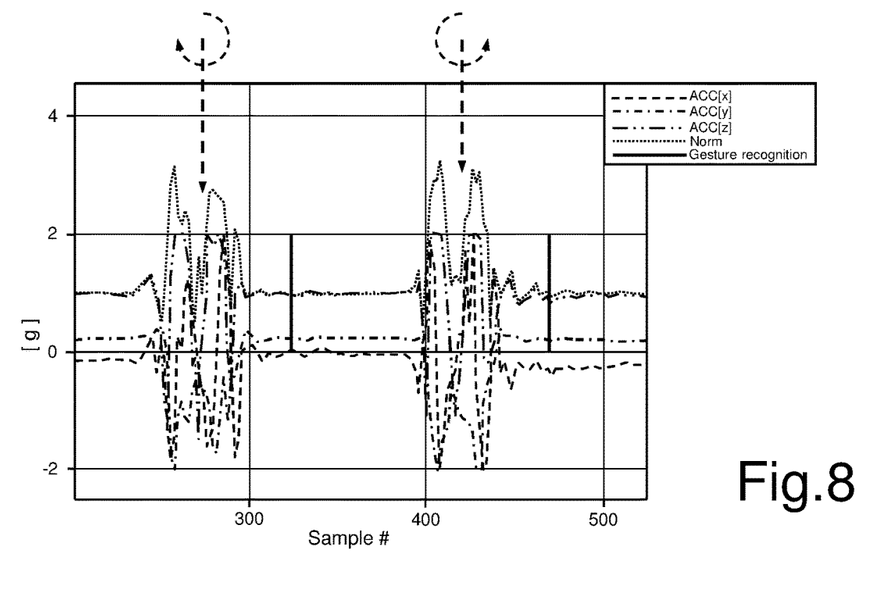
FIG. 8 shows plots of quantities related to the third specific gesture-recognition algorithm.

FIG. 8 moreover shows the plots of the components of the accelerometer signal Acc[x, y, z] along the X, Y, Z axes during the gesture to be recognized and moreover the plot of the norm of the same accelerometer signal Acc and the gesture-recognition signal $S_r$.

In detail, as shown at step 50, in this case the preliminary condition envisages checking a positive peak of the accelerometer component Acc[z] along the Z axis, comparing the same accelerometer component Acc[z] with a positive threshold $Th_z$ and checking the condition Acc[z]22 $Th_z$.

At step 51, a peak in the absolute value of the accelerometer component Acc[x] along the X axis is then checked, comparing the same absolute value with a threshold $Th_x$ and checking the condition |Acc[x]|>$Th_x$.

At step 52, a check on the sign of the accelerometer component Acc[x] along the X axis allows to discriminate between a clockwise (Acc[x]>0) or anti-clockwise (Acc[x] <0) circle gesture.

In case of a clockwise circle gesture, a negative zero-crossing for the same accelerometer component Acc[x] along the X axis is then checked, at step 53.

Afterwards, a negative peak of the accelerometer component Acc[x] along the X axis, comparing the same accelerometer component Acc[x] with negative threshold $-Th_x$ is first checked, at step 54 (Acc[x]<$-Th_x$); then, a positive peak of the accelerometer component Acc[z] along the Z axis, comparing the same accelerometer component Acc[z] with the positive threshold $Th_z$ is subsequently checked, at step 55 (Acc[z]>$Th_z$).

A final check is then performed, at step 56, in order to verify the completion of the circle gesture and avoid false detection, in particular: checking that the absolute value of the accelerometer component Acc[x] along the X axis is below a threshold $Th_x$ and, also, that the absolute value of the accelerometer component Acc[y] along the Y axis is below a respective threshold $Th_y$ (this condition being indicative that the digital-pen-like device 1 is still and substantially lying in the horizontal plane).

If this condition is verified (possibly for a given time interval), then the recognition of the gesture (in particular the clockwise circle gesture) is completed and the gesture-recognition signal $S_r$ is asserted (a respective impulse is generated, as shown in the left side portion of the plot of FIG. 8).

In a corresponding manner, in case of an anti-clockwise (or counter-clockwise) circle gesture (as verified at the above discussed step 52), a positive zero-crossing for the accelerometer component Acc[x] along the X axis is first checked, at step 63.

Afterwards, a positive peak of the accelerometer component Acc[x] along the X axis, comparing the same accelerometer component Acc[x] with a positive threshold $Th_x$ is checked, at step 64; subsequently, a positive peak of the accelerometer component Acc[z] along the Z axis, comparing the same accelerometer component Acc[z] with the positive threshold $Th_z$ is checked, at step 65.

The final check is then performed, at step 66, in order to verify the completion of the circle gesture and avoid false detection, in particular: checking that the absolute value of the accelerometer component Acc[x] along the X axis is below a threshold $Th_x$ and also that the absolute value of the accelerometer component Acc[y] along the Y axis is below a respective threshold $Th_y$ (this condition being indicative that the digital-pen-like device is still and substantially lying in the horizontal plane).

If this condition is verified, then the recognition of the gesture (in particular the anti-clockwise circle gesture) is completed and the gesture-recognition signal $S_r$ is asserted (a respective impulse is generated, as shown in the right side portion of the plot of FIG. 8).

As will be clear from the above examples, and as previously discussed, each of the gesture-recognition algorithms implemented by the gesture-recognition signal processor 6 envisages specific checks on one or more the components of the decomposed motion signal $S_m$ (in the example the accelerometer signal Acc), executed in a given sequence and in a given time interval, including: the check of the gesture-specific preliminary condition, being indicative of a preliminary phase of the gesture to be recognized, required to proceed with the next steps of the gesture recognition; the check of the gesture-specific sequence of conditions to be verified (in a specific order and in a predetermined time interval) on one or more the components of the decomposed motion signal $S_m$ (e.g., envisaging comparisons with thresholds, positive or negative peak detections, zero-crossing detections, etc.), being indicative of the pattern of movements over time jointly representing the gesture to be recognized; and the final check, again based on at least one of the motion-signal components, allowing to confirm and validate the recognition of the specific gesture and to reject false detections.

Figure 9:
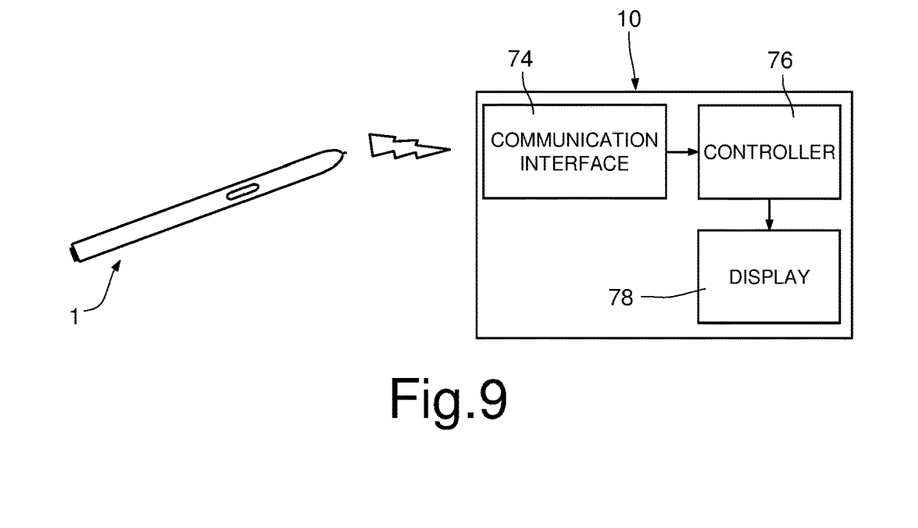
FIG. 9 is a schematic block diagram of a system including the digital-pen-like device of FIG. 1 and an associated host apparatus.

FIG. 9 schematically shows the digital-pen-like device 1, communicatively coupled to the associated host apparatus 10, for example a smartphone, a phablet or a tablet.

The host apparatus 10 may comprise: a respective communication interface 74, to communicate with the data transmission module 8a of the digital-pen-like device 1 (see FIG. 1), e.g. via the Bluetooth Low Energy data communication; a main controller 76, e.g. a microprocessor unit; and a display 78, defining a screen frame, on which movement of a cursor or other similar displayed element is controlled by the main controller 76.

The digital-pen-like device 1 may provide displacement information to the main controller 76 of the host apparatus 10, which is configured to control the movement of the cursor or other similar displayed element on the display 78 according to the same displacement information (the digital-pen-like device 1 implementing an "air pointer").

Moreover, the same main controller 76 of the host apparatus 10 is configured to receive the data-packets indicative of the gesture recognition provided by the digital-pen-like device 1 and, in response thereto, trigger suitable actions in the same host apparatus 10, such as control of reproduction of slides or other multimedia content, etc. (the digital-pen-like device 1 thus allowing further advanced user interactions).

The advantages of the solution proposed are clear from the foregoing description.

In any case, it is again underlined that the proposed solution allows to achieve a simplified layout and design of the circuit board (e.g., a PCB—Printed Circuit Board) ii of the digital-pen-like device 1, due to the fact that no buttons and/or touch surfaces or similar elements are needed to implement an advanced user interface (the user gestures performed with the same digital pen device 1 are in this case used to trigger actions in the corresponding host apparatus 10).

Simplification of the PCB layout allows to reduce the overall size of the digital-pen-like device 1 (allowing to achieve a desired ultra-slim design), or to increase the size of the battery unit 9 of the digital pen device 1, thereby increasing the life and duration thereof.

The current consumption of the digital-pen-like device 1 is also strongly reduced with respect to standard solution, being in the order of just a few μA (e.g., about 10-15 μA in the case of hardware implementation of the gesture-recognition signal processor 6, including the current consumption of both the same recognition module 6 and the motion sensor 2), this leading to a further extended battery life.

The proposed solution also allows to reduce the manufacturing costs.

Moreover, the user experience is enhanced, since natural user gestures are exploited, instead of mechanical buttons or touch surfaces.

The Applicant has tested the solution with multiple users with results of accuracy higher than 95% in the gesture recognition, after just a few attempts to understand the gestures by the same users.

The proposed solution moreover provides an increased configurability, allowing to recognize a plurality of user gestures (on the contrary, use of mechanical buttons or touch surfaces allows for a limited number of corresponding actions to be triggered).

It is moreover underlined that the number and type of algorithms implemented by the gesture-recognition signal processor 6 of the digital-pen-like device 1 may even be reconfigured and reprogrammed during the life of the same digital-pen-like device 1, e.g. via a software (firmware) update, thereby allowing an even greater configurability, also during the lifetime of the device.

Finally, it is clear that modifications and variations may be made to what has been described and illustrated herein, without thereby departing from the scope of the present invention, as defined in the annexed claims.

In particular, it is again underlined that the gesture-recognition signal processor 6 may be configured to implement different and/or further gesture-recognition algorithms, with respect to those discussed in details by way of example. For example, further algorithms could be envisaged for recognition of further user-gestures, such as a square or triangle gesture, a thrust gesture, and so on.

Moreover, different and/or further motion sensors can be envisaged, to provide the motion signals $S_m$, based on which the same gesture-recognition algorithms operate (even if use of a single motion sensor, in particular an accelerometer sensor, may be advantageous to reduce at a minimum level the power consumption).

The pre-processing module 4 coupled to the motion sensor 2 may also include a number of filter blocks, e.g. a low-pass filtering block, a high-pass filtering block and so on; in this case, the gesture-recognition signal processor 6 may receive at its input a corresponding number of pre-processed motion signals, that may be used in different conditions (for example, the initial or preliminary check may be implemented based on a high-pass filtered motion signals $S_m$ (or on the motion signals $S_m$ without pre-processing), while the final positional check may be implemented on a low-pass filtered motion signals $S_m$).

Moreover, it is again underlined that the present solution may be advantageously applied to digital-pen (pencil) devices, smart-pen (pencil) devices, pointer devices or any similar hand-held device having electronic pen (pencil) function, pointer functions and/or additional functions allowing to increase the user interface experience and ease of use.

What is claimed is:

1. A gesture-recognition system for a digital-pen-like device, comprising:
   a motion sensor configured to provide a motion signal indicative of movements of the digital-pen-like device;
   a pre-processing circuit coupled to the motion sensor, the pre-processing circuit configured to receive and filter the motion signal;
   a gesture-recognition signal processor coupled to the pre-processing circuit and configured to process the motion signal and to implement a plurality of gesture recognition algorithms based on the motion signal, each of the gesture recognition algorithms being configured to recognize a corresponding specific gesture performed by a user with the digital-pen-like device; and
   a controller coupled to the gesture-recognition signal processor and configured to transmit gesture-recognition data indicative of a recognized gesture towards a host apparatus, with which the digital-pen-like device is associated.

2. The system according to claim 1, wherein each of the gesture recognition algorithms implemented by the gesture-recognition signal processor comprises:
   a preliminary check, based on the motion signal, of a condition indicative of a preliminary phase of the specific gesture to be recognized;
   in response to the preliminary check having been verified, a sequence of further checks based on the motion signal over a given time interval, the overall sequence of checks being indicative of a movement pattern associated with the specific gesture to be recognized; and, in response to the sequence of checks having been verified, a final check, based on the motion signal, to confirm and validate the recognition of the specific gesture and reject false recognitions.

3. The system according to claim 2, wherein the gesture-recognition signal processor is configured to decompose the motion signal in respective motion-signal components along three axes of a reference system associated with the digital-pen-like device; and wherein the preliminary check, the sequence of checks and the final check are based on one of the motion-signal components of the motion signal.

4. The system according to claim 3, wherein the preliminary check, the sequence of checks and the final check comprise one or more of the following:
   a comparison of the of the motion-signal components with one or more thresholds;
   detection of positive or negative peaks of the one of the motion-signal components; and
   detection of positive or negative zero-crossings of one of the motion-signal components of the motion signal.

5. The system according to claim 1, wherein the gesture-recognition signal processor is configured to provide a gesture-recognition signal to the controller as an interrupt signal, to wake-up the controller from a sleep condition with minimum energy consumption.

6. The system according to claim 1, wherein the gesture-recognition signal processor is a hardware module, comprising:
   a plurality of digital-processing resources, one for each gesture recognition algorithm; and
   a data register, accessible by the controller and coupled to the plurality of digital-processing resources to store data indicative of a recognized gesture.

7. The system according to claim 1, further comprising a data-communication module operable by the controller to transmit the gesture-recognition data towards the host apparatus, with which the digital-pen-like device is associated.

8. The system according to claim 1, wherein the gesture recognition algorithms implemented by the gesture-recognition signal processor are configured to recognize one or more of the following gestures performed by the user with the digital-pen-like device: a shake gesture, a circle gesture, a check-sign gesture.

9. The system according to claim 1, further comprising a printed circuit board, designed to be housed in a case of the digital-pen-like device, to which the motion sensor, the gesture-recognition signal processor and the controller are electrically coupled.

10. The system according to claim 1, wherein the motion sensor is an accelerometer sensor and the motion signal is an accelerometer signal indicative of accelerations acting on the digital-pen-like device due to the gestures performed by the user.

11. An electronic system comprising a digital-pen-like device, the digital-pen-like device comprising:
   a motion sensor configured to provide a motion signal indicative of movements of the digital-pen-like device;
   a pre-processing circuit coupled to the motion sensor, the pre-processing circuit configured to receive and filter the motion signal;
   a gesture-recognition signal processor, coupled to the pre-processing circuit and configured to process the motion signal and to implement a plurality of gesture recognition algorithms based on the motion signal, each of the gesture recognition algorithms being configured to recognize a corresponding specific gesture performed by a user with the digital-pen-like device; and
   a controller coupled to the gesture-recognition signal processor and configured to transmit gesture-recognition data indicative of a recognized gesture towards a host apparatus, with which the digital-pen-like device is associated.

12. The system according to claim 11, further comprising an associated host electronic apparatus, wherein the host electronic apparatus comprises: a communication interface, to communicate with the digital-pen-like device and receive the gesture-recognition data from the controller; and
   a controller configured to trigger actions in the host electronic apparatus based on the received gesture-recognition data and corresponding to the recognized gestures.

13. The system according to claim 11, wherein the motion sensor comprises an accelerometer.

14. The system according to claim 11, wherein the gesture-recognition signal processor comprises a digital signal processor implementing a hardware based finite state machine.

15. A gesture-recognition method for a digital-pen-like device, comprising:
   generating a motion signal indicative of movements of the digital-pen-like device;

filtering the motion signal;

processing the filtered motion signal to implement a plurality of gesture recognition algorithms based on the filtered motion signal, each of the gesture recognition algorithms being configured to recognize a corresponding specific gesture performed by a user with the digital-pen-like device; and transmitting gesture-recognition data indicative of a recognized gesture towards a host apparatus, with which the digital-pen-like device is associated.

16. The method according to claim 15, wherein each of the gesture recognition algorithms comprises: a preliminary check, based on the filtered motion signal, of a condition indicative of a preliminary phase of the specific gesture to be recognized; in response to the preliminary check having been verified, a sequence of further checks based on the filtered motion signal over a given time interval, the overall sequence of checks being indicative of a movement pattern associated with the specific gesture to be recognized; and, in response to the sequence of checks having been verified, a final check, based on the filtered motion signal, to confirm and validate the recognition of the specific gesture and reject false recognitions.

17. The method according to claim 16, further comprising decomposing the filtered motion signal in respective motion-signal components along three axes of a reference system associated with the digital-pen-like device; and wherein the preliminary check, the sequence of checks and the final check are based on one of the motion-signal components of the filtered motion signal.

18. The method according to claim 17, wherein the preliminary check, the sequence of checks and the final check comprise one or more of the following:

a comparison of the one of the motion-signal components with one or more thresholds;

detection of positive or negative peaks of one of the motion-signal components; and detection of positive or negative zero-crossings of one of the motion-signal components of the filtered motion signal.

19. The method according to claim 18, wherein the gesture recognition algorithms are configured to detect one or more of the following gestures performed by the user with the digital-pen-like device: a shake gesture, a circle gesture, and a check-sign gesture.

20. The method according to claim 15, wherein the filtered motion signal is an accelerometer signal generated by an accelerometer sensor and indicative of accelerations acting on the digital-pen-like device due to the gestures performed by the user.

* * * * *